United States Patent [19]
Miyazaki

[11] Patent Number: 5,546,371
[45] Date of Patent: Aug. 13, 1996

[54] OPTICAL HEAD

[75] Inventor: Yasuhiro Miyazaki, Akigawa, Japan

[73] Assignee: Olympus Optical Co., Ltd., Tokyo, Japan

[21] Appl. No.: 469,813

[22] Filed: Jun. 6, 1995

[30] Foreign Application Priority Data

Jul. 28, 1994 [JP] Japan .................. 6-176781

[51] Int. Cl.⁶ .................................. G11B 7/00
[52] U.S. Cl. .................. 369/112; 369/103; 369/110; 369/116; 369/44.14
[58] Field of Search ................... 369/112, 110, 369/109, 103, 44.14, 107, 120, 122, 116; 250/216

[56] References Cited

U.S. PATENT DOCUMENTS

| | | | |
|---|---|---|---|
| 5,247,506 | 9/1993 | Sugiura ............................. | 369/110 |
| 5,283,771 | 2/1994 | Kadowaki et al. ............... | 369/44.14 |
| 5,313,441 | 5/1994 | Imai et al. ........................ | 369/44.14 |
| 5,396,061 | 3/1995 | Taniguchi et al. ................ | 250/216 |
| 5,406,543 | 4/1995 | Kobayashi ........................ | 369/122 |
| 5,410,468 | 4/1995 | Horimouchi ..................... | 369/103 |
| 5,446,719 | 8/1995 | Yoshida et al. .................. | 369/116 |
| 5,465,247 | 11/1995 | Kobayashi ...................... | 369/109 |

FOREIGN PATENT DOCUMENTS

| | | |
|---|---|---|
| 64-35737A | 2/1989 | Japan . |
| 4-177643 | 6/1992 | Japan . |

OTHER PUBLICATIONS

Katayama, et al., "Compact Optical Module Integrated with Chip Elements for Magneto–Optical Disks", 28a–SF–11, Extended Abstracts (The 54th Autumn Meeting, 1993); The Japan Society of Applied Physics, p. 1008.

Ohba, et al., "Prismless Optical Head of Magneto–Optical Disk Using Polarizing Holographic Optical Element", 28a–SF–12, Extended Abstracts (The 54th Autumn Meeting, 1993); The Japan Society of Applied Physics, p. 1008.

*Primary Examiner*—Loha Ben
*Attorney, Agent, or Firm*—Watson Cole Stevens Davis, P.L.L.C.

[57] ABSTRACT

The optical head includes a light source, a reflection mirror for bending the light flux from the light source to an information recording medium, an outward and inward path light separating element for separating an outward path light incident on the recording medium through the reflection mirror and an inward path light reflected on the recording medium, an objective lens for condensing the outward path light on the recording medium, a semiconductor substrate having a semiconductor crystal layer with inclined surfaces and plane surfaces adjacent to the inclined surface, and at least one pair of photodiodes embedded in the inclined surface and the plane surface, respectively. The inward path light emanated from the outward and inward path light separating element is incident on one of these photodiodes, thereby photo-electrically converting the incident light into electrical signals. The inward path light reflected on the one photodiode is incident on the other of the photodiodes, thereby photo-electrically converting the incident light into electrical signals, resulting in acquisition of information signals and servo signals based on these photoelectrically converted signals.

17 Claims, 5 Drawing Sheets

FIG_1

FIG_2

FIG. 3

Crystallographic axis

OPTICAL HEAD

BACKGROUND OF THE INVENTION

1. Field of the Invention

The present invention relates to an optical head capable of adapting to an optical information reproducing device, which reproduces the information recorded on an optical recording medium or an opto-magnetic recording medium.

2. Related Art Statement

As a conventional example of an optical head capable of adapting to an optical information reproducing device, which reproduces the information recorded on an optical recording medium or an opto-magnetic recording medium, the optical head is disclosed, for example in Japanese patent application opened Nos. 177,643/92, 35,737/89, Articles 28a-SF-11 and 28a-SF-12 disclosed in the 54th Applied Physics in Japan.

In the optical head shown in Japanese patent application opened No. 177,643/92, a prism (micro-prism) is disposed on a optical detecting means, a wave plate is adjoined to an oblique plane of the prism and a polarizing film is provided to the surface of the wave plate, an outgoing light from a semiconductor laser diode (LD) is reflected on the polarizing film to illuminate the recording medium, and the reflected light from the recording medium is detected by the optical detecting means through the polarizing film, the wave plate and the prism, thereby reproducing the information signals recorded on the recording medium.

In the optical head shown in Japanese patent application opened No. 35,737/89, the beam emanated from the light generating element is illuminated on the recording medium (disk) through first and second diffracting lattices which are disposed so as to cross the lattice arranging direction to each other, the emanated light from the recording medium is incident on first and second light receiving elements having light path difference through the second diffracting lattice, and the reproduced signal and error signal (tracking error signal) are obtained. As shown in FIGS. 6A and 6B of the above Japanese patent application opened No. 35,737/89, this conventional example utilizes a microprism in order to obtain the above light path difference, so that it constructs a planar optical head of 3 beam system without using a beam splitter.

In the conventional example shown in the above article, the semiconductor laser (LD), the photodetector (PD), the polarizing holograph and the opto-magnetic signal detecting micro-prism are accommodated in the same package and modularized to intend to downsize the optical head.

In the examples shown in Japanese patent application opened No. 177,643/92 and the above Article, the micro-prism (the prism constructed on the semi-conductor substrate together with other elements) having a size smaller than that of the prism utilized as the optical element of single body is utilized, so that it is impossible to work the micro-prism. Moreover, the micro-prism is formed on the surface of the photo-detector, so that it is necessary to perform the centering control and the position fixing of the micro-prism while observing the signals from the photodetector in practice, and thus very precise assembling and adjusting technique is required, thereby causing an increase of production cost.

While in the conventional example of the above Japanese patent application opened No. 35,737/89, the micro-prism is used to obtain the optical path difference, so that the same problem as in the above in accompany with the micro-prism arises. In addition thereto, this conventional device does not use a polarization separating function, so that the opto-magnetic signal can not be reproduced, and thus it is impossible to adapt the opto-magnetic information signal reproducing device.

SUMMARY OF THE INVENTION

It is an object of the present invention to eliminate the above described disadvantages of the conventional optical head.

It is another object of the present invention to provide an optical head, in which an optical system having the same function without using the micro-prism is formed on the semiconductor substrate, thereby making the price low, and by causing simplification of adjustment, and by making durability high.

According to the present invention, there is provided an optical head comprising a light source, a reflection mirror for bending or reflecting the light flux from the light source to an information recording medium, an outward and inward path separating element for separating an outward path light incident on the recording medium through the reflection mirror and an inward path light reflected on the recording medium, an objective lens for condensing the outward path light on the recording medium, a semiconductor substrate having a semiconductor crystal layer with inclined surfaces and plane surfaces adjacent to the inclined surface, and at least two pairs of two photodiodes embedded in the inclined surface and the plane surface, whereby the inward path light emanated from the outward and inward path separating element is incident on the either one of these photodiodes, thereby photo-electrically converting the incident light into electrical signals, and the inward light reflected on said photodiode is incident on the other of the photodiodes, thereby photo-electrically converting the incident light into electrical signals, resulting in an information signal and a servo signal based on these photoelectrically converted signals.

According to the present invention, an dielectric multi-layer film having a polarization separating function is stacked on a surface of either one of the photodiodes formed on the inclined surface and the photodiodes formed on the plane surface, so that the polarization separating function is added to the optical head, and thus the photo-magnetic information signal can be reproduced.

In an embodiment of the image display system according to the present invention, the semiconductor crystal layer, the photodiodes, the outward and inward path separating element, the reflection mirror and the light source are formed in a unitary shape, so that it is preferable to realize the downsizing of the information reproducing device by unifying elements other than the objective lens of the optical elements forming the optical head.

According to the construction of the present invention, the light flux from the light source is bent or reflected by the reflection mirror to the information recording medium to form an outward path light, and is incident on the recording medium through the outward and inward path separating element and the condenser lens, and then the inward path light reflected on the recording medium is separated by the outward and inward path separating element from the outward path light and is incident on the either one of the photodiodes which are embedded in the inclined surface and the plane surface of the semiconductor crystal layer having inclined surfaces and plane surfaces adjacent to the inclined surface, thereby photo-electrically converting the incident light into electrical signals, at the same time, the light flux reflected on the photodiode is incident on the other photodiode to convert it into electrical signals. Therefore, the information signal and the servo signal are obtained based on these photoelectrically converted signals.

DETAILED EXPLANATION OF THE PREFERRED EMBODIMENT

Now to the drawings, there are shown various embodiments of an optical heads according to the present invention. Like parts are shown by corresponding reference characters throughout several views of the drawings.

Figure 1:
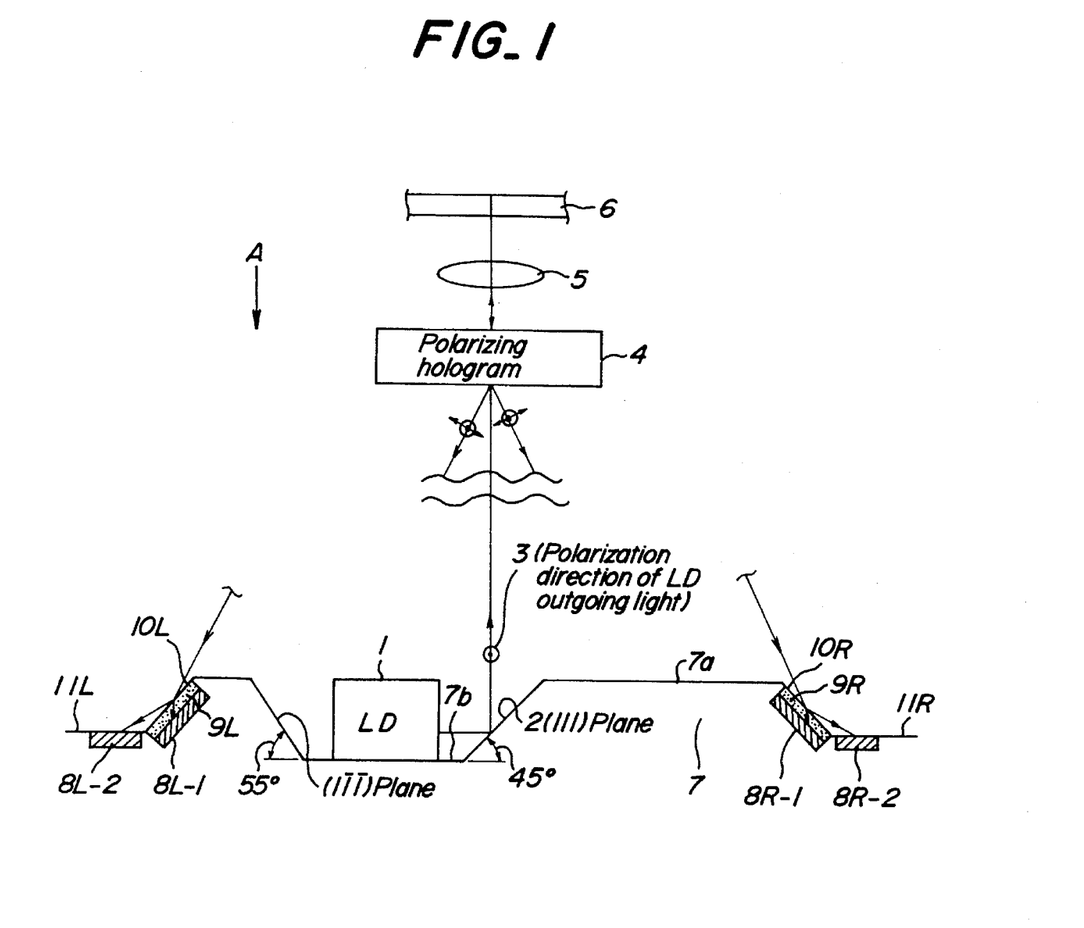
FIG. 1 is a plan view showing a brief construction of first embodiment of an optical head according to the present invention.

FIG. 1 shows a brief construction of first embodiment of the optical head according to the present invention. In FIG. 1, reference numeral 7 is a semiconductor substrate, which is, in this embodiment, a silicon semiconductor substrate.

Respective optical elements are formed on the surface of the semiconductor substrate 7 by a cutting work, which is described in detail hereinafter. As a light source, a laser diode (hereinafter, referred to as LD) 1 is provided in a united form on a horizontal surface 7b, which is formed with a difference in level to a top surface 7a of the semiconductor substrate. In order to bend or reflect the light path of the outgoing light from the LD by 90°, the level difference is formed by the cutting work in such a manner that an incident angle of the light emanated from the LD is 45°, thereby forming a mirror surface 2. This mirror surface 2 utilizes a plane (111) of silicon crystal.

The light path of outgoing light of the LD 1 bent by the mirror surface 2 is incident on a polarizing hologram 4 under the polarized state in the direction of a sign 3. This polarizing hologram 4 has a spectral ratio set in such a manner that the polarized light in the direction of the sign 3 is diffracted by about 30% and the polarized light in the direction orthogonal to the sign 3 is diffracted by 100%, so that about 70% of the outward path light polarized fully in the direction of the sign 3 is transmitted through the polarizing hologram and is incident on a recording medium (hereinafter, referred to as a disk) 6 by condensing through an objective lens 5.

The inward light reflected by information recording tracks of the disk 6 has a polarizing plane rotated by ±θk° and is again incident on the polarizing hologram 4 through the objective lens 5, so that the polarized light in the direction orthogonal to the sign 3 caused by rotation of the polarizing plane is diffracted by about 100% and the polarized light in the direction parallel to the sign 3 is diffracted by about 30%, and thus these diffracted lights are separated from the outward path as one light flux. This diffracted light has ± first ordered light which is incident on polarization beam splitters 9L and 9R formed on crystal inclined surfaces 10L and 10R provided on the semiconductor substrate 7 at azimuth of 45° and then the polarized light in the direction parallel to the incident angle is transmitted by about 100% and is incident on photodiodes 8L-1 and 8R-1 embedded in the inclined surfaces 10L and 10R. While the polarized light in the direction orthogonal to the incident angle is reflected by about 100% and is incident on photodiodes 8L-2 and 8R-2 embedded in plane surfaces 11L and 11R adjacent to the inclined surfaces, respectively. The inclined surfaces 10L and 10R as well as the plane surfaces 11L and 11R are disposed in bilateral symmetry with respect to the outward path of the light.

The polarization beam splitters 9L and 9R utilize (1-1-1) plane of the silicon crystal and thus the angle between the polarization beam splitter surface and the mirror surface becomes 70.5° in crystal structure of silicon crystal. In FIG. 1, the bar is added over the number or figure, but in the specification, the bar is added before the number or figure, for convenience. This is applied to the explanation in FIG. 5.

Figure 2:
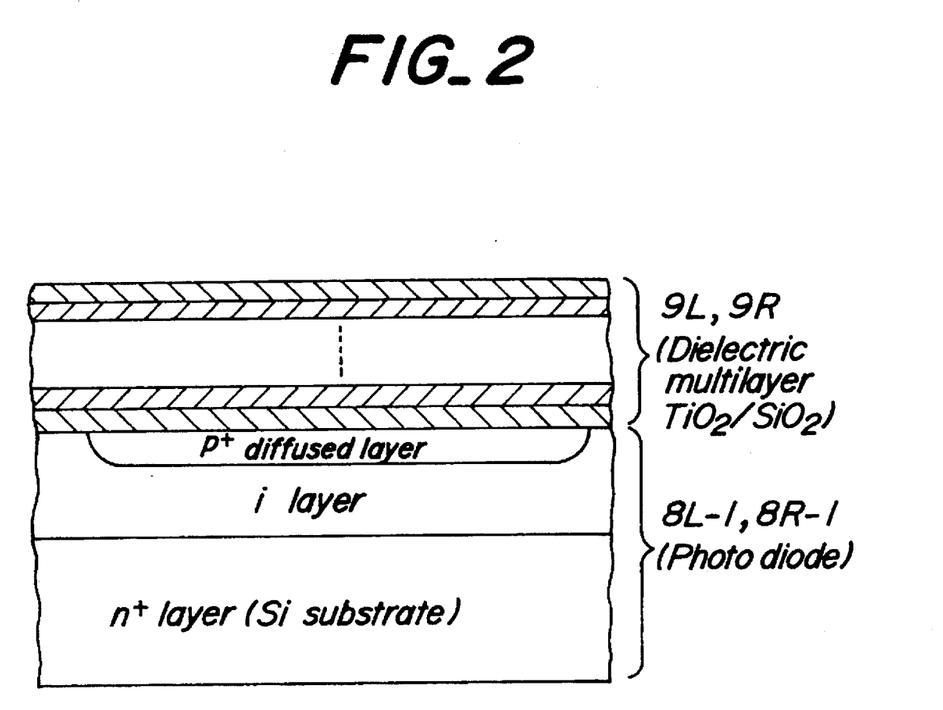
FIG. 2 is a cross-sectional view showing an polarization beam splitter shown in FIG. 1.

The polarization beam splitters 9L and 9R are formed on the photodiodes 8L-1 and 8R-1, respectively, as shown in FIG. 2. That is, the dielectric multilayer film constructed by alternately disposed $TiO_2$ layers and $SiO_2$ layers (polarizing film) is provided by, for example, deposition process on the surface of PIN type photodiode 8L-1 and 8R-1 (photodiodes 8L-2 and 8R-2 also have the same structure) having respective layers of n layer, i layer and p layer which are embedded in the silicon substrate by diffusion step, thereby using this dielectric multilayer film as a polarization beam splitter. In this embodiment, respective layers of alternately disposed $TiO_2$ layers and $SiO_2$ layers forming the dielectric multilayer film have their film thicknesses of 131/278/264/319/258/315/263/284/111 nm in order. In this case, the s polarization reflectance factor becomes Rs=95.7%, and the p polarization transmittivity becomes Tp=99.9%. The design of the dielectric multilayer film can be optimized by selecting the incident angle and the construction of the multilayer film construction optionally based on the whole layout of of the optical head.

The p polarized light transmitted through the polarization beam splitters (the dielectric multilayer film) 9L and 9R is photoelectrically converted by the photodiodes 8L-1 and 8R-1 provided under the polarization beam splitters 9L and 9R, and the s polarized light reflected on the polarization beam splitters 9L and 9R is photoelectrically converted by the photodiodes 8L-2 and 8R-2 embedded in the horizontal surfaces 11L and 11R. Respective data (current value) obtained by this photoelectric conversion are subjected to a differential operation, thereby obtaining the information signals.

Figure 3:
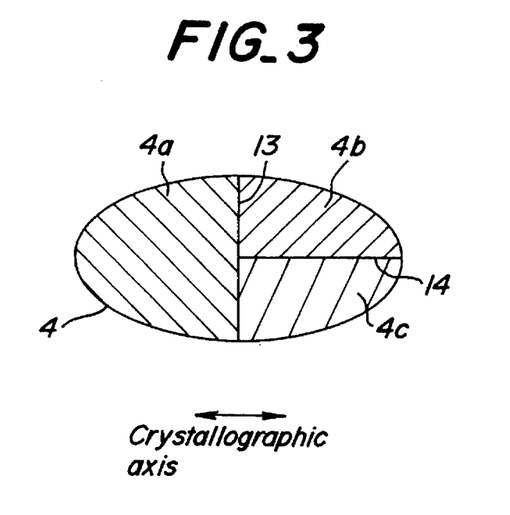
FIG. 3 is a detailed explanatory view showing a polarizing hologram shown in FIG. 1.
Figure 4:
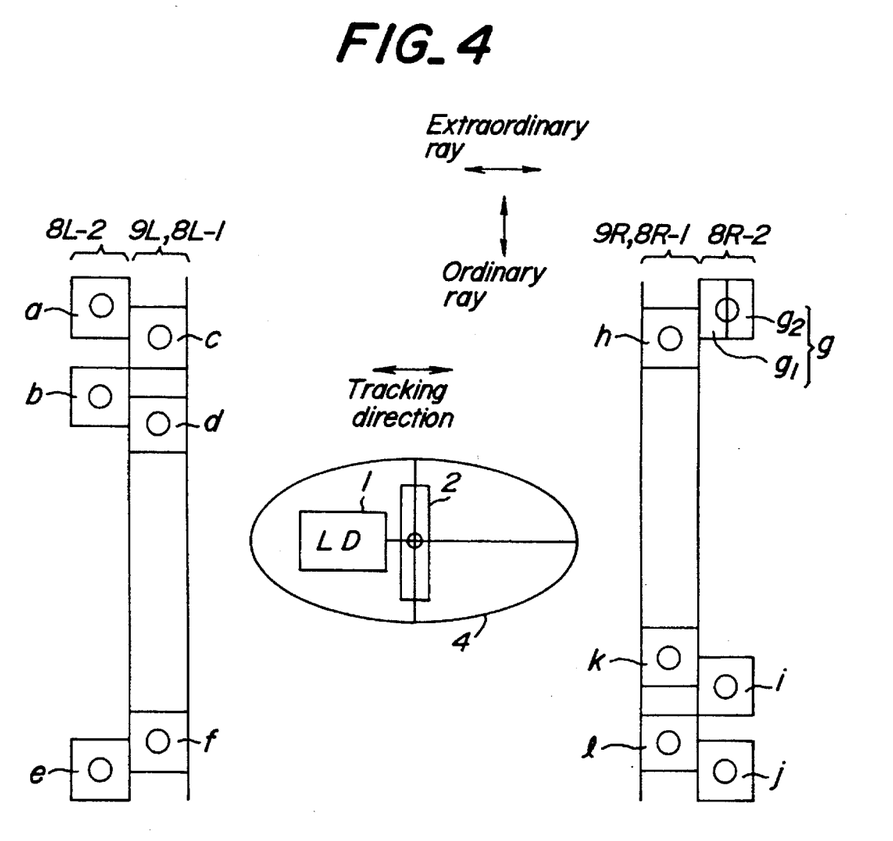
FIG. 4 is a plan view showing the optical head designated in the direction of an arrow A of FIG. 1.

The above differential operation is now explained by using detailed views of the polarizing hologram shown in FIG. 3 and FIG. 4 being the view in the direction of an arrow A of FIG. 1. In this differential operation, the knife edge method is utilized to detect the focusing error signal (servo signal) and the push-pull method is utilized to detect the tracking error signal.

In FIG. 4, the outgoing light of the LD 1 is reflected on the mirror 2 and proceeds to the outward path of the light upper direction perpendicular to the paper plane. The polarizing hologram 4, the objective lens, and recording medium are successively arranged in the outward path and the outward path light is an ordinary ray to the crystallographic axis of the polarizing hologram 4, so that about 70% of the outward path light does not diffract but proceeds straightly, and thus it is incident on the recording medium through the objective lens.

The outward path light reflected by the recording medium is incident on the polarizing hologram 4 through the objective lens, the extraordinary ray component being an optomagnetic signal component is diffracted by about 100%, and the ordinary ray component is diffracted by about 30%. The polarizing hologram 4 utilizes a common transmission type of the polarizing hologram utilizing a dense lattice having a pitch smaller than the wavelength so as to satisfy the Bragg condition, or a double refraction crystal lattice such as $LiNbO_3$. This polarizing hologram is divided into three regions 4a, 4b, 4c as shown in FIG. 3, respective regions have different pitch and lattice direction, respectively, a separating line 13 exhibits a knife edge function of the detection of focusing error signal, and a separating line 14 exhibits pupil separating line of the detection of tracking error signal.

The ± first ordered light diffracted on a region 4a of the polarizing hologram 4 is incident on a region f of the photodiode 8L-1 through the polarization splitter 9L and lead to a region h of the photodiode 8R-1 through the beam splitter 9R. The lights partially reflected on the beam splitters 9L and 9R are incident on the region e of the photodiode 8L-2 and the region g (g1, g2) of the photodiode 8R-2, respectively. In FIG. 4, signs a to 1 show the embedded position of the photodiodes, respectively.

The light diffracted by the region 4b of the polarizing hologram 4 is incident on a region c of the photodiode 8L-1 through the polarization beam splitter 9L and lead to a region 1 of the photodiode 8R-1 through the beam splitter 9R. The lights partially reflected on the beam splitters 9L and 9R are incident on the region a of the photodiode 8L-2 and the region j of the photodiode 8R-2, respectively. The light diffracted by the region 4c of the polarizing hologram 4 is incident on a region d of the photodiode 8L-1 through the polarization beam splitter 9L and lead to a region k of the photodiode 8R-1 through the beam splitter 9R. The lights partially reflected on the beam splitters 9L and 9R are incident on the region b of the photodiode 8L-2 and the region i of the photodiode 8R-2, respectively.

Respective photodiodes photoelectrically convert the incident lights into current data (optical currents), which are supplied to a differential operating circuit (not shown), and these currents are differentially operated to obtain respective signals.

Focusing error signal=g1−g2

Tracking error signal=(a+c+j+1)−(b+d+i+k)

Opto-magnetic information signal =(a+b+e+g+i+j)−(c+d+f+h+k+l)

Sum signal=a+b+c+d+e+f+g+h+i+j+k+1

In this way, the first embodiment may construct the optical head capable of adapting it to the opto-magnetic information signal and optical information signal without using the micro-prism, thereby making the price low, causing simplification of adjustment, and making durability high.

Figure 5:
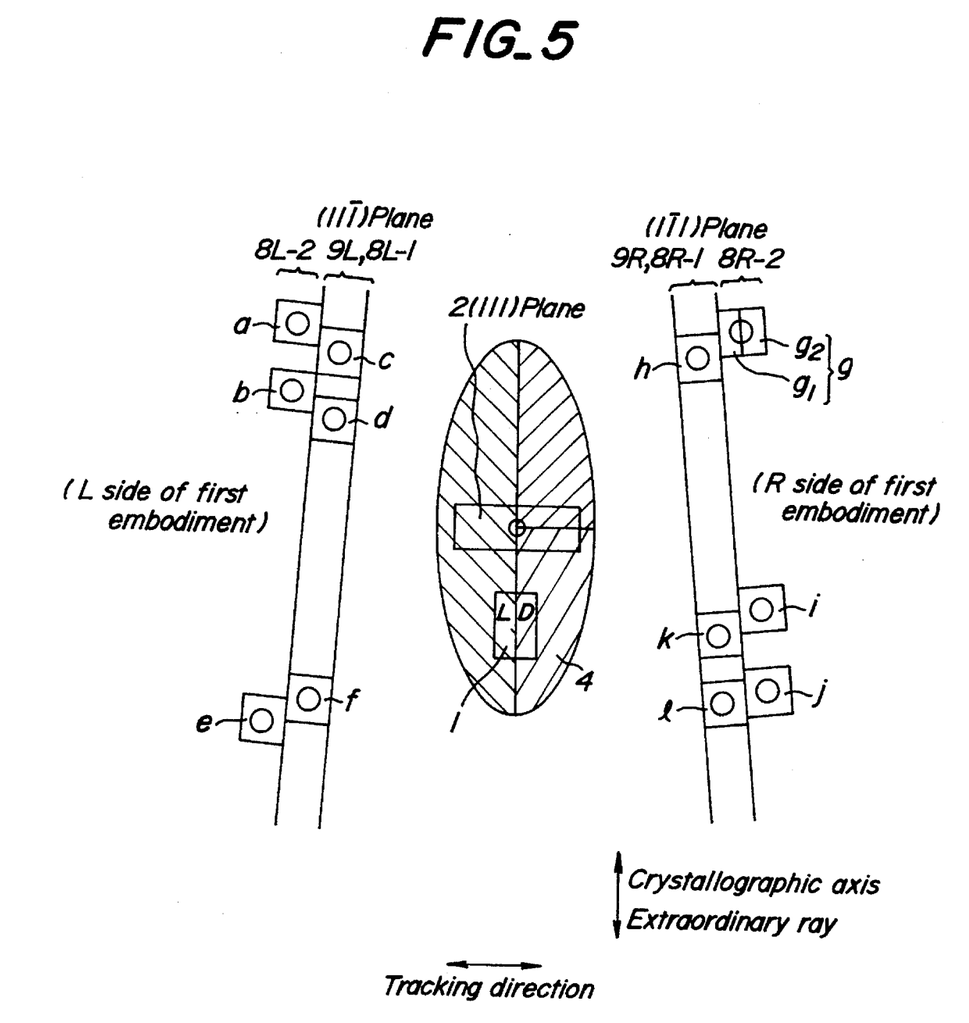
FIG. 5 is a brief construction of second embodiment of the optical head according to the present invention.

FIG. 5 shows brief construction of essential parts of a second embodiment of the optical head according to the present invention. The different point from the first embodiment in this embodiment is that the silicon crystal plane for using as the mirror plane or the polarization beam splitter plane is changed. That is, in this second embodiment, the plane of the mirror 2 is (111) crystal plane, the polarization beam splitter plane 9R is (11-1) crystal plane and the polarization beam splitter plane 9L is (1-11) crystal plane. The silicon substrate is previously offset by 9.75° and cut in order that the incident angle to the mirror plane becomes 45°.

Now, the silicon crystal plane is considered. On the view of construction of silicon crystal, there are twenty-six kinds of crystal planes from the combination of the crystal planes orthogonal to the lattice vector, but the angle between fellow crystal planes used in this embodiment is as follows:

The angle between (111) crystal plane and (11-1) crystal angle is 109.5°.

The angle between (11-1) crystal plane and (1-11) crystal angle is 70.5°.

Therefore, the positional coordinate of the polarization beam splitter planes 9L and 9R in the junction plane of the LD 1 may be optimized in order that the polarization azimuth to the incident plane of the diffracted light of the polarizing hologram incident on the (11-1) crystal plane and (1-11) crystal plane becomes 45°.

Figure 6A:
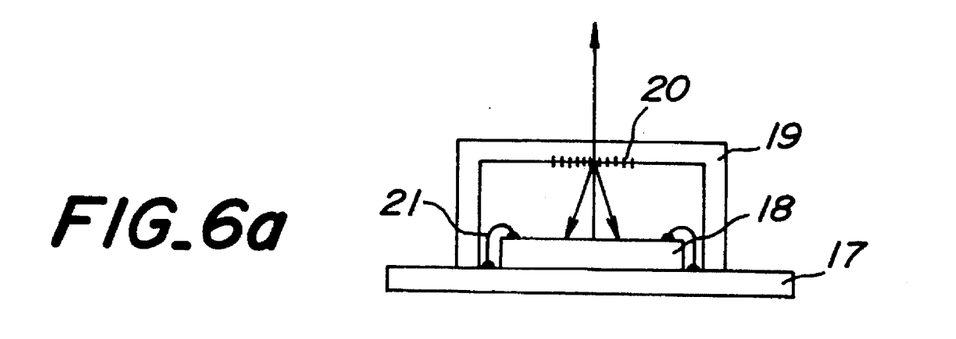
FIGS. 6a and 6b are side views showing brief construction of third embodiment of the optical head according to the present invention.
Figure 6B:
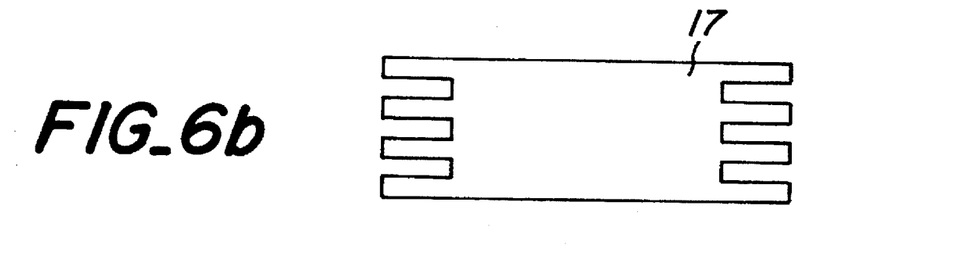

Moreover, the polarization beam splitter may be constructed by optimizing the design of the dielectric multilayer film in accordance with the incident angle of the diffracted light of the polarizing hologram and the mirror plane and the polarization beam splitter plane can also be formed on the same semiconductor substrate with the combinations of the crystal planes different from the above crystal plane combination by selecting the offset angle of the semiconductor substrate. FIGS. 6a and 6b show the plan view and the side view designated in the direction of an arrow B, which are shown showing brief construction of third embodiment of the optical head according to the present invention. This third embodiment constructs the elements other than the objective lens of the elements forming the optical head in a unified form and is made a flat mold package construction used commonly in an integrated circuit or the like. In FIGS. 6a and 6b, numeral 18 is a semiconductor crystal layer (semiconductor substrate) in the same manner as the first embodiment (FIG. 1) including LD, the reflection mirror and the photodiode. Respective elements in the semiconductor crystal 18 are electrically connected to a comb 17 through wire bondings 21. Moreover, the semiconductor crystal layer 18 is covered by an outward and inward path separating element 19, and the outward and inward path separating element 19 is formed in a closed construction. A hologram 20 is formed on the inner periphery and the upper surface of the outward and inward path separating element 19.

By such a uniform construction, the optical head can be downsized and its reliability made high.

In the above respective embodiments, the polarizing hologram is utilized in order to separate the inward path light from the outward path light; the present invention is not limited to this, but various modifications or changes can be performed. For example, a polarization beam splitter formed by a common optical glass prism can be utilized instead of the polarizing hologram. Moreover, the polarization beam splitter and the photodiode are formed and mounted on the same semiconductor substrate without including light source (Laser Diode), thereby using it as a light receiving element. Also, the dielectric multilayer film on the photodiode is omitted, thereby obtaining a construction, in which the polarization beam splitter is not included. In this case, the information in the medium utilizing reflectance factor difference of phase changing type can be reproduced. The dielectric single layer film is formed on the photodiode, so that anti-reflection function can be added and transmittivity can be controlled. The plane previously illuminated the reflection light from the recording medium separated by the outward and inward path separating element is made a horizontal plane (11L and 11R in FIG. 1) and these light fluxes reflected on the horizontal plane may be incident on the oblique plane (10L and 10R in FIG. 1).

Moreover, if a plurality of pairs of a set of photodiodes embedded in the oblique plane and the horizontal plane, respectively are provided, the tracking error signals can be detected with simple construction.

If the semiconductor crystal layer is a silicon layer, the laser diode as a light source and a photodiode as an photoelectric conversion element can be integrated easily.

If the semiconductor crystal layer, the photodiode and the light source are formed in a uniform shape, it may be combined with the outward and inward path separating element of optical glass prism.

As described above, according to the present invention, the outward path light reflected on the recording medium is diffracted by the outward and inward path separating element, and is incident on any one of the photodiodes embedded in the oblique plane and the horizontal plane, respectively, thereby photoelectric converting the incident light flux, at the same time, the light flux reflected on said diode is incident on the other diode embedded in the oblique plane and the horizontal plane, thereby photoelectric converting the incident light flux, so that the information signals and the servo signals can be obtained in accordance with these photoelectric converted signals, thereby obtaining a downsized, low-priced optical head with easy adjustment and high durability.

What is claimed is:

1. An optical head comprising:

a light source for emitting a light flux;

a reflection mirror for bending the light flux from the light source to form an outward path light beam;

an objective lens, receiving the outward path light beam, for focusing the outward path light beam into an information recording medium;

an outward and inward path light separating element for separating the outward path light beam from an inward path light beam reflected from the recording medium;

a semiconductor substrate having a semiconductor crystal layer with at least one inclined surface and at least one horizontal surface adjacent to the at least one inclined surface; and at least one pair of photodiodes including a first photodiode embedded in the at least one inclined surface and a second photodiode embedded in the at least one horizontal surface, said at least one pair of photodiodes being disposed with respect to the outward and inward path light separating element such that at least a portion of the inward path light beam emanating from the outward and inward path light separating element is incident on one of the first and second photodiodes photo-electrically converting the incident light into electrical and a portion of the inward path light beam reflected from said one of the first and second photodiodes is incident on the other one of the first and second photodiodes.

2. An optical head as claimed in claim 1, wherein said one of the first and second photodiodes comprises a dielectric multi-layer film having a polarization separating function, the dielectric multi-layer film being provided on a surface of said one of the first and second photodiodes to separate the inward path light beam incident on said one of the first and second photodiodes into a first polarization component which is photo-electrically converted by said one of the first and second photodiodes and a second polarization component which is reflected to and photo-electrically converted by said other one of the first and second photodiodes.

3. An optical head as claimed in claim 2, wherein the semiconductor crystal layer, the photodiodes, the outward and inward path light separating element, the reflection mirror and the light source are secured to a common base to form an integral unit.

4. An optical head as claimed in claim 1, wherein the semiconductor crystal layer, the photodiodes, the outward and inward path light separating element, the reflection mirror and the light source are secured to a common base to form an integral unit.

5. An optical head as claimed in claim 1, wherein the reflection mirror is a planar surface of the semiconductor crystal layer.

6. An optical head as claimed in claim 5, wherein said planar surface of the semiconductor crystal layer is located on a (111) plane of the semiconductor crystal layer.

7. An optical head as claimed in claim 1, wherein the outward and inward path light separating element comprises a polarizing hologram.

8. An optical head as claimed in claim 1, wherein said at least one pair of photodiodes comprises at least two pairs of photodiodes whose first photodiodes are embedded in a common one of said at least one inclined surface and whose second photodiodes are embedded in a common one of said at least one horizontal surface.

9. An optical head comprising:

a light source for emitting a light flux;

a reflection mirror for bending the light flux from the light source to form an outward path light beam;

an objective lens, receiving the outward path light beam, for focusing the outward path light beam onto an information recording medium;

an outward and inward path light separating element for separating the outward path light beam from an inward path light beam reflected from the recording medium;

a semiconductor substrate having a semiconductor crystal layer with a plurality of inclined surfaces and a plurality of horizontal surfaces respectively adjacent to corresponding ones of the plurality of inclined surfaces; and a plurality of pairs of photodiodes, each of said plurality of pairs of photodiodes including:

a first photodiode embedded in one of said inclined surfaces and a second photodiode embedded in one of said horizontal surfaces, said first and second photodiodes being disposed with respect to the outward and inward path light separating element such that a portion of the inward path light beam emanating from the outward and inward path light separating element is incident on one of said first and second photodiodes and a portion of the inward path light beam reflected from said one of the first and second photodiodes is incident on the other one of the first and second photodiodes.

10. An optical head as claimed in claim 9, wherein said one of the first and second photodiodes comprises a dielectric multi-layer film having a polarization separating function, the dielectric multi-layer film being provided on a surface of said one of the first and second photodiodes to separate the portion of the inward path light beam incident on said one of the first and second photodiodes into a first polarization component which is photo-electrically converted by said one of the first and second photodiodes and a second polarization component which is reflected to and photo-electrically converted by said other one of the first and second photodiodes.

11. An optical head as claimed in claim 10, wherein the semiconductor crystal layer, the photodiodes, the outward and inward path light separating element, the reflection mirror and the light source are secured to a common base to form an integral unit.

12. An optical head as claimed in claim 9, wherein the semiconductor crystal layer, the photodiodes, the outward and inward path light separating element, the reflection mirror and the light source are secured to a common base to form an integral unit.

13. An optical head as claimed in claim 9, wherein the reflection mirror is a planar surface of the semiconductor crystal layer.

14. An optical head as claimed in claim 13, wherein the planar surface of the semiconductor crystal layer is located on a (111) plane of the semiconductor crystal layer.

15. An optical head as claimed in claim 9, wherein the outward and inward path light separating element comprises a polarizing hologram.

16. An optical head as claimed in claim 15, wherein the polarizing hologram comprises a plurality of regions for directing portions of said inward path light beam toward said plurality of pairs of photodiodes.

17. A optical head as claimed in claim 9, wherein said plurality of pairs of photodiodes comprises at least two pairs of photodiodes whose first photodiodes are embedded in a common one of said plurality of inclined surfaces and whose second photodiodes are embedded in a common one of said plurality of horizontal surfaces.

\* \* \* \* \*